United States Patent [19]

Price et al.

[11] Patent Number: 4,768,625
[45] Date of Patent: Sep. 6, 1988

[54] SELF-ENERGIZING DISC BRAKES

[75] Inventors: Anthony G. Price, Gwent, Wales; Roy Campbell, Worcestershire, England; Andrew P. Green, Gwent, Wales

[73] Assignee: Lucas Industries, Birmingham, England

[21] Appl. No.: 16,851

[22] Filed: Feb. 20, 1987

[30] Foreign Application Priority Data

Feb. 26, 1986 [GB] United Kingdom ............... 8604717

[51] Int. Cl.⁴ ............................................. F16D 55/04
[52] U.S. Cl. ................................. 188/71.4; 188/72.2; 192/70
[58] Field of Search .................. 188/71.3, 71.4, 72.2, 188/2 D, 72.7; 192/70

[56] References Cited

U.S. PATENT DOCUMENTS

| | | | |
|---|---|---|---|
| 1,989,179 | 1/1935 | Versluis | 188/72.2 X |
| 1,998,675 | 4/1935 | La Brie | 188/71.4 |
| 2,633,941 | 4/1953 | Zindler | 188/71.3 X |
| 3,342,290 | 9/1967 | Klaue | 188/71.4 |
| 3,343,632 | 9/1967 | Kershner et al. | 188/71.4 |
| 3,392,805 | 7/1968 | Kreitner | 188/71.4 |
| 3,424,279 | 1/1969 | Frigger | 188/71.3 |
| 4,391,352 | 7/1983 | Brown | 188/24.12 |

FOREIGN PATENT DOCUMENTS

| | | | |
|---|---|---|---|
| 2324037 | 11/1973 | Fed. Rep. of Germany | 188/71.4 |
| 857552 | 4/1940 | France | 188/2 D |
| 982138 | 1/1951 | France | 188/72.2 |
| 1053160 | 9/1953 | France | 188/2 D |

Primary Examiner—George E. A. Halvosa
Attorney, Agent, or Firm—Oldham & Oldham Co.

[57] ABSTRACT

A disc brake of the spreading type is actuated by means of a "Bowden" cable (20) which acts between radial lugs (25, 29) on the pressure plates (6, 7). The cable (20) is angled with respect to the plane of the plates (6, 7), preferably substantially to complement the helix motion of the balls or rollers (13) co-operating with the ramps in the recesses (14).

12 Claims, 2 Drawing Sheets

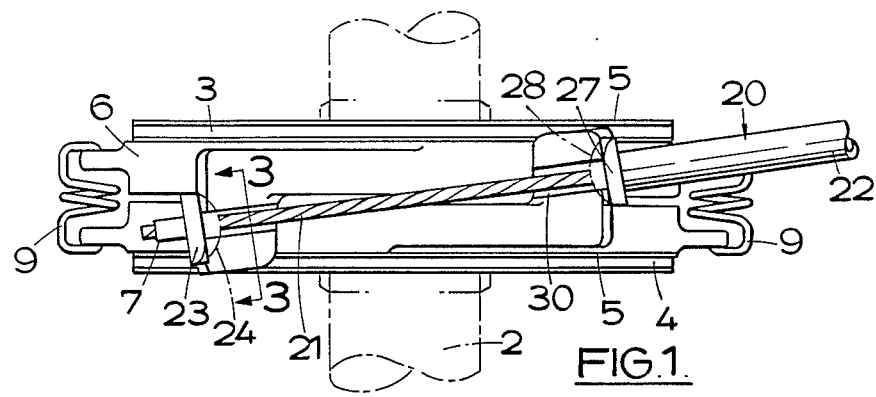
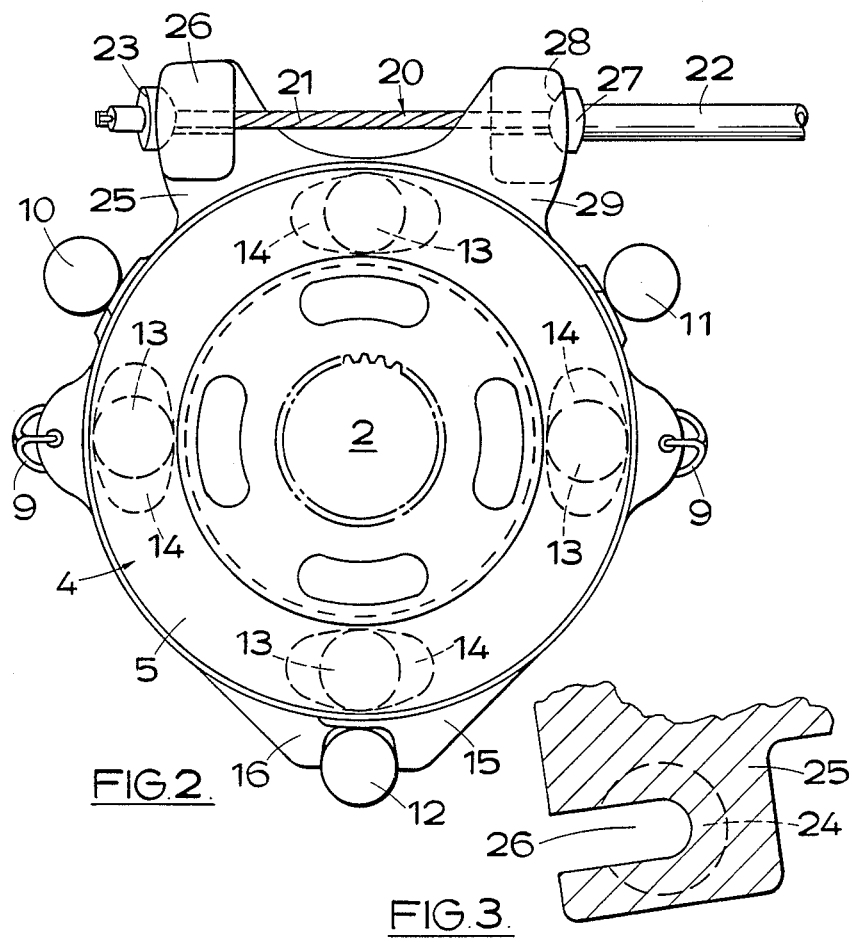

SELF-ENERGIZING DISC BRAKES

This invention relates to self-energising disc brakes of the kind in which rotatable friction discs provided with friction linings are adapted to be brought into engagement with spaced opposed braking surfaces in a housing by pressure plates located between the friction discs and centred by stationary pilot lugs, application of the brake being initiated by angular movement of the pressure plates effected by operation of a brake-applying mechanism connected to radially projecting actuator lugs on the plates, and through which a brake-applying force is applied to the plates, balls or rollers being located in co-operating oppositely inclined recesses in the adjacent faces of the plates such that on operation of the brake-applying mechanism to move the pressure plates angularly in opposite directions, the engagement of the balls or rollers with ramps defined by the recesses causes the pressure plates to move apart into engagement with the friction discs which are urged into engagement with the braking surfaces, the pressure plates being carried round with the friction discs until one is arrested by the engagement of a lug on the plate with a drag-taking stop abutment in the housing and the continued angular movement of the other pressure plate provides a servo action.

Self-energising brakes of the kind set forth may be dry or they may be of the liquid cooled type, and such brakes are commonly used in tractors and like vehicles.

In known brakes of the kind set forth the brake-applying mechanism may comprise links which are pivotally connected to the radially projecting lugs on the plates and through which a brake-applying force, for example from a pedal, is applied to the plates when a pull-rod, which is pivotally connected to the links, is moved in a radial direction. In another arrangement a cam is carried by a cam shaft which is rotatable within a radial bore in the housing, and the cam acts on the lugs on the plates through rocking thrust members or dollies which are moved relatively apart to separate the lugs in response to rotation of the cam shaft.

We are also awar of GB No. 1 276 617 which shows a disc brake in which two pressure plates are provided, one of which acts on a piston which in turn acts on a disc to be braked. The pressure plates are each provided with an axially extending spigot, each of which is concentric with the axle to be braked and concentric with the other. The outer end of each spigot carries a flange which in turn carries a radially extending lug by which the brake is adapted to be mechanically actuated. Inner and outer co-axial inextensible members of a cable assembly act between the radial lugs on the two plates with the cable assembly extending tangentially to the pressure plates and in a plane parallel to the plane of the pressure plates. Mechanical actuation of the brake is effected by operating the cable assembly to draw the two lugs together, in turn to move the pressure plates angularly relative to each other, a conventional ball and ramp mechanism producing a corresponding axial separation of the plates.

According to our invention, in a self-energising disc brake of the kind set forth the brake-applying mechanism comprises a cable assembly co-operating with the lugs, the cable assembly comprising relatively movable components the relative movement of which causes relative angular movement between the pressure plates in order to initiate application of the brake, the cable assembly acting along a line which extends between the actuator lugs and which is inclined relative to a plane parallel to the plane of the pressure plates.

This provides a simple and cheap means of actuating the brake.

Preferably the cable assembly is angled with respect to the plane of the plates substantially to complement the helix motion of the balls or rollers co-operating with the ramps defined by the edges of the recesses in the plates.

In one construction the cable assembly comprises flexible co-axial inner and outer inextensible members acting between the actuator lugs on the plates, the inner member projecting from the adjacent end of the outer member, and the members carrying at their free ends part-spherical ferrules for co-operation with complementary abutment faces provided at the opposite circumferentially outermost ends of the actuator lugs. The part-spherical outline of the ferrules and the abutment faces enable them to accommodate relative articulation as the plates move away from each other in the application of the brake. Thus the inner inextensible member does not have to flex or bend during brake application.

This brake-applying mechanism is particularly suitable for the relatively low input loads associated with parking brakes of the high speed transmission type.

The cable assembly can be readily sealed in the wall of the housing of the brake which makes it eminently suitable for incorporation in brakes of the liquid cooled type. In such a construction the cable assembly can follow any convenient route and can be adapted to radial and tangential brake inputs.

An adjuster may be incorporated at any convenient location in the length of the cable assembly to adjust the effective length of the assembly to compensate for wear of the friction lining of the brake.

Conveniently the adjuster may comprise an adjustable earth connection for an end of one of the inner or outer members.

One embodiment of our invention is illustrated in the accompanying drawings in which:

FIG. 1 is a plan of a brake of the kind set forth including the brake-applying mechanism;

FIG. 2 is an end elevation of the same;

FIG. 3 is a section on the line 3—3 of FIG. 1; and

Figure 4:
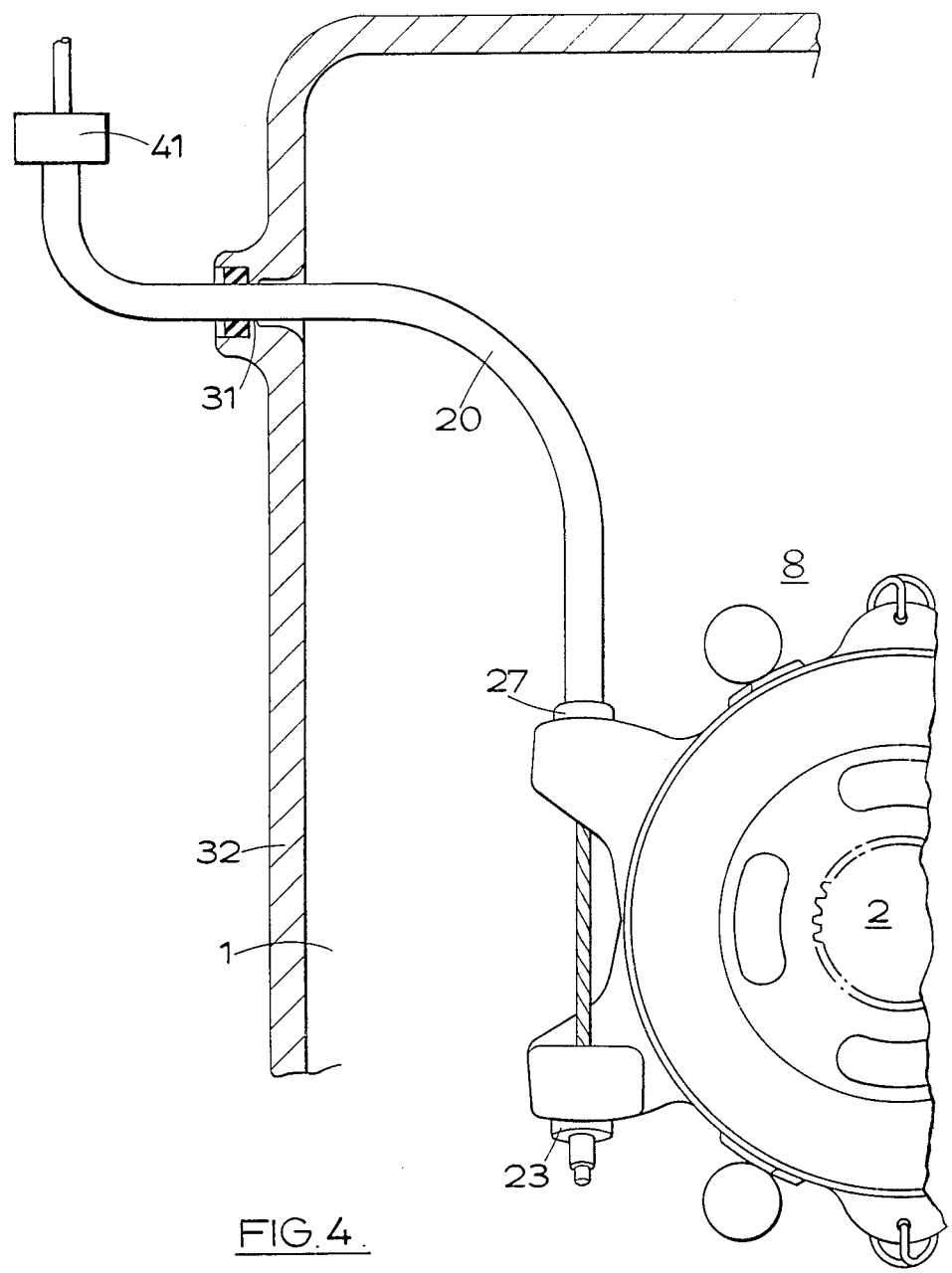
FIG. 4 shows a typical arrangement of the brake within a housing.

The self-energising disc brake illustrated in the drawings comprises a housing 1 through which a rotatable shaft 2 extends axially. A pair of axially spaced friction discs 3, 4 provided on opposite sides with linings 5 of friction material are slidably splined on the shaft 2. The discs 3, 4 are adapted to be brought into engagement with axially spaced radial braking surfaces 8 at opposite ends of the housing 1 by a pair of annular pressure plates 6 and 7 which are located between the discs and are centred by three stationary pilot lugs 10, 11, 12 on the housing 1. Balls or rollers 13 are located in angularly spaced co-operating oppositely inclined recesses 14 in adjacent faces of the pressure plates 6 and 7. Angularly spaced compression return springs 9 act between the plates 6 and 7 to urge them towards each other.

The application of the brake is initiated by moving the pressure plates 6 and 7 angularly in opposite directions which causes the balls 13 to tend to ride up ramps formed by the walls of recesses 14, and the pressure plates 6, 7 then move apart into engagement with the friction discs 3, 4 to urge them into engagement with the radial surfaces 8 on the housing 1.

When the discs 3, 4 are rotating in one direction, the plates 6 and 7 are carried round with the discs 3, 4 until one plate is arrested by the engagement of a radial lug 15, 16 on that plate with an adjacent face on a drag-taking stop abutment defined by the adjacent end of the pilot lug 12. Continued angular movement of the other plate provides a servo-action to increase the braking torque.

When the shaft 2 is rotating in the opposite direction and the brake is applied, the sequence described above is repeated exept that the angular movement of the other plate is arrested.

The angular movement of the plates 6, 7 to apply the brake is initiated by a brake applying mechanism 20. As illustrated the mechanism comprises a cable assembly consisting of an inner flexible inextensible member 21 slidably guided for relative sliding movement in an outer flexible inextensible member comprising a casing 22. The inner member 21 projects from the adjacent end of the casing 22 and carries at its outer end a ferrule 23 having a part-spherical face for sliding engagement with a part-spherical face 24 at the base of a recess in the outer face of a radial actuator lug 25 on the plate 5. The lug 25 has a radial slot 26 to receive the member 21. The adjacent free end of the casing 22 from which the member 21 projects carries a ferrule 27 having a part-spherical face for sliding engagement with a part-spherical face 28 at the base of a recess in the outer face of a radial actuator lug 29 on the plate 7. The lug has a radial slot 30 through which the member 21 extends. The lugs 25 and 29 extend axially in opposite directions to overlie the peripherial edge of the other plate 7 and 6. Thus the line of action of the portion of the cable assembly which extends between the two lugs is angled with respect to the plane of the plates 6 and 7.

The cable assembly 20 extends through a sealed opening 31 in the wall 32 of the housing 1. The end of the casing 22 remote from the brake is in abutment with an earth abutment (not shown) and the corresponding end of the inner member is coupled to brake-applying means, suitably a lever or foot-pedal.

In the application of the brake a pull applied to the brake-applying means acts to withdraw the inner member and alter the chordal length thereby drawing the two lugs 25 and 29 towards each other to effect application of the brake as described above.

The cable assembly 20 is angled so as substantially to complement the helical motion of the plates due to the engagement of the balls with the ramps. By this means relative articulation of the cable assembly with respect to the lugs 25, 29 is reduced. During brake actuation the lugs tend to move together along the existing line of the cable, little twisting of the cable is experienced. Keeping the cable assembly 20 at substantially the same angle relative to the plane of the pressure plates during actuation of the brake ensures that flexing of the cable assembly at its connections with the lugs 25, 29 due to the pressure plates moving apart is substantially eliminated. Thus the cable assembly experiences less stress fatigue.

By angling the line of the cable assembly with respect to the plane of the pressure plates any change in angle between the line and the plane of the pressure plates which occurs during brake actuation is reduced in comparison to what it would have been if the line were parallel to that plane. Chosing the angle to be complementary to the helical motion of the plates substantially to eliminate any change in angle is preferred.

The brake preferably incorporates an adjuster operative to reduce the chordal length between the lugs 25, 29 to compensate for wear of the friction linings 5. Such an adjuster may comprise may conventional adjuster located in any convenient position to sense excessive relative movement between the members 21, 22 of the assembly, or excessive bodily displacement of the cable assembly itself. Alternatively the position of the earth abutment for the end of casing 22 remote from the brake may be adjustable manually; such as by adjustable earth connection 41, schematically shown in FIG. 4.

In the brake described above the direction of the cable assembly where it emerges from the housing 1 may be tangential or radial with respect to the axis of the brake. The facility to emerge from the housing radially can be especially important in oil-cooled disc brakes where it is necessary to effect a good seal at apertures in the housing. An aperture for a radially extending relatively stationary casing can be readily sealed.

We claim:

1. A self-energising disc brake comprising a housing, first and second axially spaced braking surfaces in said housing, radial pilot lugs and a drag-taking stop abutment in said housing, first and second axially spaced pressure plates centred on said pilot lugs and defining an axial gap therebetween, first and second actuator lugs provided respectively on said first and second pressure plates and having, respectively, first and second cable engagement surfaces, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and brake-applying means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried round with said discs until one of said plates is arrested by the engagement of a lug on that plate with said drag-taking stop abutment, whereafter continued angular movement of the other of said plates provides a servo action, wherein said brake-applying means comprises a cable assembly co-operating with said first and second actuator lugs, said cable assembly comprising a first component having a first abutment surface and a second component having a second abutment surface, said first and second components being movable relative to each other and said first and second abutment surfaces being adapted to engage with said first and second cable engagement surfaces of said first and second actuator lugs respectively, relative movement between said first and second components causing relative angular movement between said pressure plates in order to initiate application of the brake, and wherein said cable assembly acts along a line which extends between said actuator lugs and which is inclined relative to a plane parallel to the planes of said pressure plates in a sense that complements said camming means so that when said brake is actuated any change in the angle between said line and said plane is reduced in comparison to the change in angle between said line and said plane which would occur due to said pressure plates moving relatively circumferentially and axially apart during brake actuation if before brake actuation said line were parallel to said plane.

2. A disc brake according to claim 1 wherein said line is inclined with respect to said plane at an angle which substantially fully compensates the motion of the pressure plates produced by said balls or rollers co-operating with said ramps defined by said edges of said recesses in said plates so as to substantially eliminate said change in angle during brake actuation, said first and second cable engagement surfaces moving relative to each other substantially along said line of said cable assembly.

3. A disc brake according to claim 1 wherein said actuator lugs are arranged to be drawn together to actuate said brake by said cable assembly, said first relatively movable component of said cable assembly comprising a flexible outer co-axial member having a free end, and a first ferrule of part-spherical outline carried at said free end of said outer member and defining said first abutment surface, and said second relatively movable component of said cable assembly comprising a flexible inner co-axial member which projects from the adjacent said free end of said outer co-axial member and carries at its free end a second ferrule of part-spherical outline, defining said second abutment surface said first and second cable engagement surfaces of said first and second lugs comprising respective surfaces of complementary outlines to said first and second abutment surfaces and being in operative engagement with respective said abutment surfaces and being relatively slidable thereto during application of said brake.

4. A disc brake according to claim 3 wherein an adjuster is provided to compensate for wear of said friction linings and said adjuster comprises an adjustable earth connection for an end of one of said inner or outer members.

5. A disc brake according to claim 3 wherein said first and second cable engagement surfaces of said first and second actuator lugs are provided respectively at the circumferentially outer edges of said actuator lugs, and said actuator lugs are each provided with a slot passing therethrough, said inner co-axial member extending through said slots of said first and second actuator lugs.

6. A disc brake according to claim 1 wherein an adjuster is provided to compensate for wear of the friction linings.

7. A disc brake according to claim 1 wherein said cable assembly approaches said housing in a direction normal to said housing and is sealed to said housing.

8. A disc brake according to claim 1 wherein said first actuator lug is cranked in the axial direction towards said second pressure plate so as to provide said first cable engagement surface at an axial location overlying the peripheral edge of said second pressure plate when said brake is not actuated, said second actuator lug being cranked in the axial direction towards said first pressure plate so as to provide said second cable engagement surface at an axial location overlying the peripheral edge of said first pressure plate when said brake is not actuated.

9. A disc brake according to claim 8 wherein said line of said cable assembly is outside of the plan projection of said pressure plates.

10. A disc brake according to claim 9 wherein said line of said cable assembly transverses said axial gap.

11. A disc brake according to claim 10 wherein said line of said cable assembly is parallel to, but spaced from, a tangent to said pressure plates.

12. A self-energising disc brake comprising a housing, first and second axially spaced braking surfaces in said housing, radial pilot lugs and a drag-taking stop abutment in said housing, first and second axially spaced pressure plates centred on said pilot lugs and defining an axial gap therebetween, first and second actuator lugs provided respectively on said first and second pressure plates and having, respectively, first and second cable engagement surfaces, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and brake-applying means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried round with said discs until one of said plates is arrested by the engagement of a lug on that plate with said drag-taking stop abutment, whereafter continued angular movement of the other of said plates provides a servo action, wherein said brake-applying means comprises a cable assembly co-operating with said first and second actuator lugs, said cable assembly comprising a first component having a first abutment surface and a second relatively movable component having a second abutment surface, the first and second components being movable relative to each other and said first and second abutment surfaces being adapted to co-operatively engage with said first and second cable engagement surfaces of said first and second actuator lugs respectively, relative movement between said first and second components causing relative angular movement between said pressure plates in order to initiate application of the brake, said cable assembly acting along a line which extends between said actuator lugs, and wherein said first and second actuator lugs are axially cranked towards the second and first pressure plates respectively so as to provide, when said brake is not actuated, said first and second cable engagement surfaces of said first and second actuator lugs at axial positions overlying the peripheral edges of said second and first pressure plates respectively, said cable assembly extending across said axial gap and being inclined relative to a plane parallel to the planes of said pressure plates at an inclination that is in the same general direction as said ramps of said recesses so as to substantially fully complement said camming means so that when said brake is actuated any change in the angle between said line and said plane which would occur if said line were parallel to said plane due to said pressure plates moving relatively circumferentially and axially apart during brake actuation is substantially eliminated due to said first and second cable engagement surfaces moving relative to each other along said line.

* * * * *

UNITED STATES PATENT AND TRADEMARK OFFICE
CERTIFICATE OF CORRECTION

PATENT NO. : 4,768,625
DATED : September 6, 1988
INVENTOR(S) : Anthony G. Price et al It is certified that error appears in the above-identified patent and that said Letters Patent is hereby corrected as shown below:

On the title page assignee should read

-- Assignee: Lucas Industries public limited company, Birmingham, England --.

Signed and Sealed this

Eighteenth Day of July, 1989

Attest:

DONALD J. QUIGG

*Attesting Officer*   *Commissioner of Patents and Trademarks*